United States Patent [19]

Periot

[11] 4,267,522
[45] May 12, 1981

[54] L.C. OSCILLATOR PROXIMITY DETECTOR

[75] Inventor: Jean-Marie Periot, Isle d'Espagnac, France

[73] Assignee: La Telemecanique Electrique, France

[21] Appl. No.: 22,027

[22] Filed: Mar. 19, 1979

[30] Foreign Application Priority Data

Mar. 17, 1978 [FR] France .................................. 78 07758

[51] Int. Cl.³ ............................ G01V 3/11; H03B 5/12
[52] U.S. Cl. ........................................ 331/65; 324/327; 331/117 R; 340/686
[58] Field of Search ............. 331/65, 117 R; 324/207, 324/208, 236, 327; 340/686

[56] References Cited

U.S. PATENT DOCUMENTS

| | | |
|---|---|---|
| 3,469,204 | 9/1969 | Magyar et al. .................. 331/117 X |
| 3,732,503 | 5/1973 | Rapp et al. ............................. 331/65 |

Primary Examiner—Siegfried H. Grimm
Attorney, Agent, or Firm—William A. Drucker

[57] ABSTRACT

A proximity detector comprises a parallel oscillatory circuit the inductance of which is influenced by the metallic element of which it is desired to ascertain the distance, this oscillatory circuit forming part of an oscillator. The oscillator is fed with constant current; current is injected into the oscillatory circuit through a negligibly small resistance; and the output signal is taken off at the output terminals of the oscillator; the device is used to provide an analog signal which is a linear function of distance, in order to classify articles or to measure their speed of approach.

6 Claims, 3 Drawing Figures

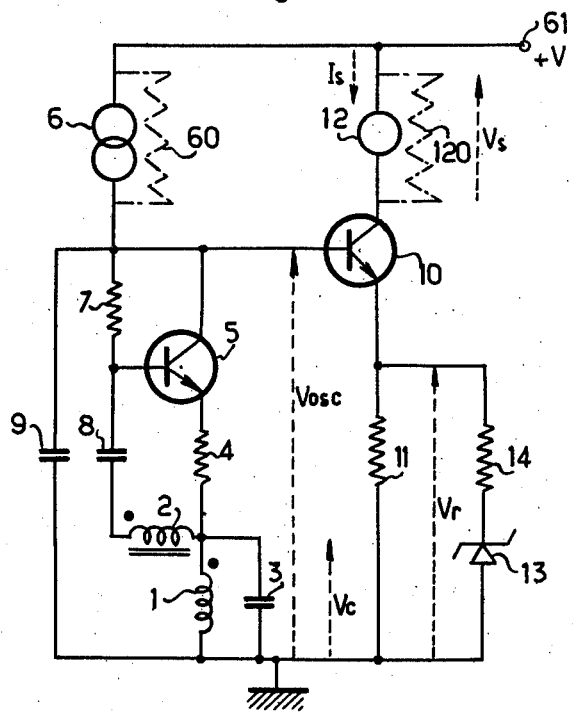
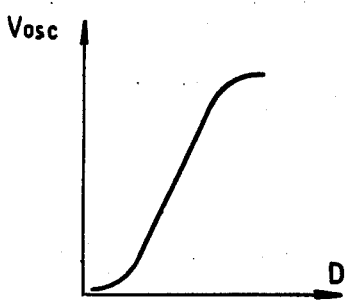
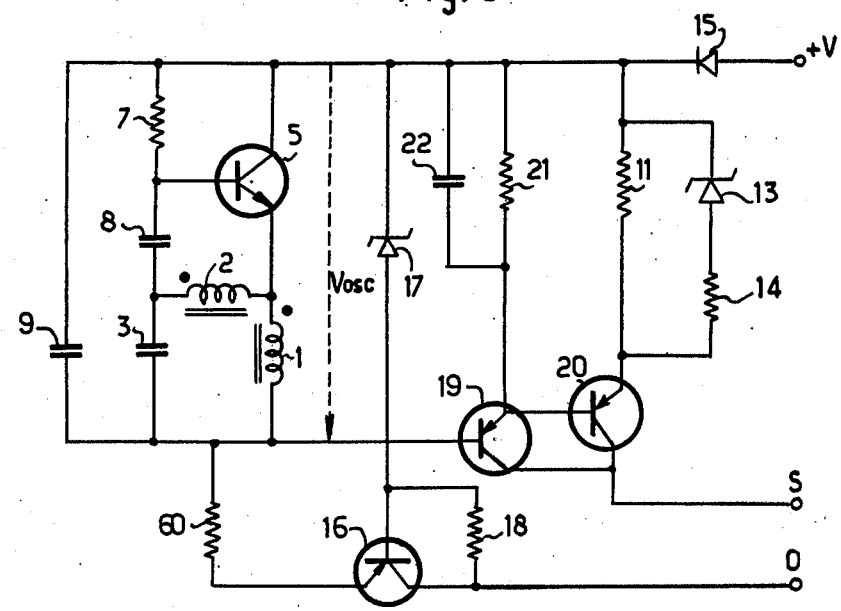

L.C. OSCILLATOR PROXIMITY DETECTOR

BACKGROUND OF THE INVENTION

The invention relates to proximity detectors of the analog inductive type comprising a parallel oscillating circuit the coefficient of quality factor and the inherent impedance of which vary as a function of the distance of a metal article which influences the coil and an amplifying means, the circuit being arranged to inject the output current of the amplifying means into said oscillating circuit through a resistance, said oscillating circuit forming part of a feedback circuit between the output and the input of the amplifying means.

These analog proximity detectors are capable of many industrial uses, such as the classifying of articles by their dimensions or by their position, measuring the speed of their approach, the indication of their direction of displacement, and others.

Such applications are suitable for distances which generally cannot exceed several centimeters and it would be desirable, at this scale of distances, to generate an analog signal which is as linear a function as possible of the distance.

The known circuits do not obtain a satisfactory linearity, in particular from the fact that they are fed at constant voltage and that the output signal is derived from the high frequency oscillation itself, which introduces a disturbance in the operation of the oscillatory circuit by applying an impedance at its terminals.

OBJECT OF THE INVENTION

The object of the present invention is to provide a circuit which is free from these inconveniences, and which is principally characterised in that the oscillator is fed with current which is substantially constant, and that the said resistance has a sufficiently low value to permit the maintaining of the oscillations as soon as the article to be detected ceases to be in the immediate proximity of the elements of the oscillatory circuit, and that the analog output signal is taken off between the input feed terminal of the oscillator and the ground terminal of the oscillatory circuit.

The various advantages, as well as other features of the invention, will appear clearly from the following description.

BRIEF DESCRIPTION OF THE DRAWING

In the drawing:

FIG. 1 shows the electrical circuit of a proximity detector conforming to a preferred embodiment of the invention;

FIG. 2 is a curve illustrating the operation of this detector, and

FIG. 3 shows a circuit analogous to that of FIG. 1, provided with certain complementary features.

DESCRIPTION OF THE PREFERRED EMBODIMENT

In FIG. 1 there is shown an oscillatory circuit constituted by two inductances 1 and 2 mounted in a ferrite pot and mutually coupled. The inductance 1 of value $L_1$ forms, with a condenser of value $C_1$ connected in parallel, a resonant circuit in which is developed a high frequency oscillation, provided that the losses of energy are compensated by the injection of a current, through a resistance 4 of value $R_E$. This current is provided by a transistor 5, for example of the NPN type, fed by a constant current generator 6. The terminal for feeding of the circuit with a d-c voltage $+V$ has been shown at 61.

A resistance 7 of value $R_3$ is mounted between the base and the collector of the transistor 5, whilst a condenser 8 is mounted, in series with the inductance 2 (of value $L_2$), between the base and the common point of the resistance 4 and the resonant circuit. A condenser 9 is mounted in parallel with the terminals of the oscillator thus constituted, that is to say between the collector of the transistor 5 and the ground point of the resonant circuit.

$$Z_1 = \frac{Q_1}{C_1 \omega} = Q_1 L_1 \omega, \text{ is the}$$

impedance of the circuit oscillating at the inherent frequency $\omega$, $Q_1$ being its quality factor in the absence of an adjacent metallic element. In the presence of a metallic element at the distance D from the pot, $Q_1$ will assume a value $Q(D)$ and $Z_1$ will assume a value $Z(D)$.

It can be shown that the limit condition for maintenance of the oscillations is given by the relationship: $R_E \approx Z(D)/2N$, N being the ratio, relatively high, of the number of turns of the windings 1 and 2 (which are wound such that the current re-injected into 2 shall be in phase with the output HF signal of the transistor).

In practice, there is given to $R_E$ a very small value, so that the condition of maintenance of the oscillations is achieved when the values $Q(D)$ or $Z(D)$ are themselves very small.

In fact this happens when the metal element which is to be detected is itself at a very small distance from the pot. When the element is very remote, $Q(D)$ or $Z(D)$ achieve their inherent values $Q_1$ and $Z_1$ respectively, which are respectively greater than $Q_{(0)}$ and $Z_{(0)}$; in short, the oscillation is maintained no matter what D is.

The peak voltage Vc of the HF signal is equal to $$Z_{(D)} I \simeq \frac{Q_{(D)} I}{C_1 \omega}$$

I being the constant current provided by the generator 6.

The d-c voltage Vosc at the terminals of the oscillator, filtered through the condenser 9, is little different from $V_C$ (the transistor being practically saturated, its voltage between collector and emitter is practically nil when the value of $R_E$ is very small).

Finally it results that the d-c voltage Vosc is a quasi-linear function of the distance D, in a range of distances less than 50 mm. for example.

This voltage is amplified by a transistor 10, for example of the NPN type, the emitter of which is coupled to ground through a resistance 11 of value R. The current Is which passes through this transistor, measured by an amperemeter 12, is substantially equal to the ratio $V_R/R$ between the voltage at the terminals of the resistance 11 and the value R of this resistance.

Thus, one finally has:

$$I_s = \frac{V_{osc} - V_{BE}}{R}$$

$V_BE$ being the voltage between base and emitter of the transistor 10. (This latter being with high gain, its base current is negligible). The current $I_s$ is thus a quasi-linear function of the distance D.

If it is desired to have an analogous signal in voltage, it is only necessary to replace the amperemeter 12 by a resistance 120 of value $R_s$ shown in broken line. The voltage $V_s$ at the terminals of this resistance will then be substantially equal to $$\frac{V_{osc} - V_{BE}}{R} \times R_s$$

that is to say a quasi-linear function of D.

In reality, in the circuit which has just been described, the curve $V_{osc}=f(D)$ presents the two defects of linearity illustrated in FIG. 2.

The defect of linearity in the region of $D=0$ is advantageously corrected by replacing the constant current generator 6 by a resistance 60 (shown in broken line in FIG. 1), of value $R_{60}$ large as compared with the variable impedance $Z_{osc}$ between the terminals of the oscillator circuit. One thus has $$V_{osc} = \frac{V Z_{osc}}{R_{60} + Z_{osc}}$$

In other words $V_{osc}$ is then a hyperbolic function of $Z_{osc}$ which tends asymptotically towards the feed voltage V when $Z_{osc}$ increases and presents a curvature, in the region of $Z=0$, inverse to that of the curve of FIG. 2. One can thus, by a suitable choice of $R_{60}$, correct the defect of linearity of $V_{osc}$ as a function of D in the region of $D=0$. This correction has on the other hand the effect of worsening the defect of linearity for the greater values required for D. This latter defect of linearity will be advantageously corrected by disposing, as shown in FIG. 1, in parallel with the resistance 11, a Zener diode 13 (or other non-linear threshold device) in series with a resistance 14 of value $R_{14}$.

For small values of D, the Zener diode remains blocked and $I_s$ is not modified by its presence. For the relatively high values of D, the value R is replaced by $$\frac{R R_{14}}{R + R_{14}} < R$$

which increases the slope of increase of I as a function of distance. One can thus correct the defect of linearity which is present for the relatively high values of D.

It will be noted that the oscillator is not influenced by the amplifier stage 5, which has a high input impedance. The output signal is taken off between the constant current feed terminal of the oscillator, and ground, and not from the high frequency signal.

As the losses of the resonant circuit increase with temperature and, as a result, $V_{osc}$ has a tendency to decrease when the temperature increases, but the amplifier 10 has on the contrary a voltage $V_{BE}$ which reduces and a gain which increases when the temperature increases, a compensation between the two opposed influences of temperature on the oscillator stage and on the amplifier stage can be obtained by a suitable choice of the parameters which define them.

In FIG. 3, there are to be seen the same components as in FIG. 1, designated by the same references. It will be seen that the emitter of the transistor 5 is coupled directly to the inductance 1, that is to say $R_E=0$. The condenser 3 is coupled to the live end of the winding 2 instead of being coupled, as in FIG. 1, to the live point of the winding 1. The feed V+ takes place across a diode 15 intended to prevent reversing of polarity in the case of error of connecting up, and the return to ground takes place across the resistance 60 and a ballast constituted by a PNP transistor the base voltage of which is fixed by a Zener diode 17, and of which the base is connected to the collector by a resistance 18.

The voltage $V_{osc}$ is amplified by a "Darlington" circuit constituted by two transistors 19 and 20 of the PNP type; the point common to the emitter of the transistor 19 and the base of the transistor 20 is coupled to the feed line by a resistance 21 choked by a condenser 22. The resistance 21 permits draining away of the leakage currents which may exist when the transistor 19 is blocked. The current $I_s$ passes through the transistor 20 and a resistance 11 in series. The Zener diode 13 and the resistance 14, in parallel with the resistance 11, play the same part as the components having the same references in FIG. 1.

It will be apparent that various modifications of detail could be made in the circuits described and shown, without exceeding the scope of the invention.

I claim:

1. A proximity detector comprising:
   a parallel oscillatory circuit having an inductance with a grounded terminal, the quality factor and the inherent impedance of the said oscillatory circuit varying as a function of the distance of a metallic object with respect to the said inductance;
   amplifier means having an input and an output;
   constant current generating means connected to the input of the amplifier means;
   feedback means connecting the output of the amplifier means to the input of the amplifier means, said feedback means including resistance means connecting the output of the amplifier means to the oscillatory circuit for feeding current thereto, wherein said resistance means have a resistance value which is sufficiently small to permit the sustenance of oscillations, as soon as the said object ceases to be in the immediate proximity of the oscillatory circuit, and output signal terminals consisting of the input of the amplifier means and the grounded terminal of the oscillatory circuit.

2. A proximity detector, as claimed in claim 1 wherein the said amplifier means include a transistor having an emitter which is connected to said resistance means and a collector which is connected to said input terminal, the proximity detector further including a further transistor having a base which is connected to the said input terminal, said further transistor having an emitter and a first further resistance connecting the emitter of said further transistor to the said grounded terminal.

3. A proximity detector adapted for measuring the distance of a metallic object in a range of distance values as claimed in claim 2, wherein said constant current generating means comprises a source of direct current voltage and a resistance connecting the said source to the input of the amplifier means, said resistance of said constant current generating means having an impedance which is substantially larger than the impedance between the said output signal terminals and which is selected to correct the defect of linearity of the output signal as a function of the said distance in the lower part of said range of distance values.

4. A proximity detector adapted for measuring the distance of a metallic object in a range of distance values as claimed in claim 2, said proximity detector further comprising the serial arrangement of a Zener diode and a second further resistance, the said serial arrangement being connected in parallel across the said first further resistance coupled in series with said further transistor and the said first and second further resistances being selected to correct the defect of linearity of the output signal as a function of the said distance, in the upper part of the said range of distance values.

5. A proximity detector, as claimed in claim 3, said proximity detector further comprising the serial arrangement of a Zener diode and a second further resistance, the said serial arrangement being connected in parallel across the said first further resistance coupled in series with said further transistor and the said first and second further resistances being selected to correct the defect of linearity of the output signal as a function of the said distance, in the upper part of the said range of distance values.

6. A proximity detector as claimed in claim 1, wherein said reistance means consists of a connection lead directly connecting the output of said amplifier means to the said oscillatory circuit.

* * * * *